(12) United States Patent
Li et al.

(10) Patent No.: US 10,929,014 B2
(45) Date of Patent: Feb. 23, 2021

(54) CHARACTER CORRECTION METHOD AND APPARATUS, DEVICE, AND STORAGE MEDIUM

(71) Applicant: Baidu Online Network Technology (Beijing) Co., Ltd., Beijing (CN)

(72) Inventors: Ping Li, Bellevue, WA (US); Mingming Sun, Beijing (CN); Xin Wang, Beijing (CN); Yue Feng, Beijing (CN); Kefeng Meng, Beijing (CN); Gang Qiao, Beijing (CN); Qiaofei Wang, Beijing (CN); Jingyuan Zhang, Beijing (CN)

( * ) Notice: Subject to any disclaimer, the term of this patent is extended or adjusted under 35 U.S.C. 154(b) by 0 days.

(21) Appl. No.: 16/507,425

(22) Filed: Jul. 10, 2019

(65) Prior Publication Data
US 2020/0081618 A1   Mar. 12, 2020

(30) Foreign Application Priority Data
Sep. 10, 2018   (CN) .......................... 201811052131.9

(51) Int. Cl.
*G06F 3/0488*   (2013.01)
*G06F 3/0481*   (2013.01)

(52) U.S. Cl.
CPC ........ *G06F 3/04886* (2013.01); *G06F 3/0481* (2013.01)

(58) Field of Classification Search
CPC .. G06F 3/04886; G06F 3/0481; G06F 3/0237; G06F 3/048
See application file for complete search history.

(56) References Cited

U.S. PATENT DOCUMENTS

| 2003/0059115 A1* | 3/2003 | Nakagawa ........... G06K 9/6807 382/197 |
| 2013/0046544 A1* | 2/2013 | Kay .................... G06F 3/04886 704/275 |

(Continued)

FOREIGN PATENT DOCUMENTS

| CN | 101719022 A | 6/2010 |
| CN | 103038728 A | 4/2013 |

(Continued)

*Primary Examiner* — Jeanette J Parker
(74) *Attorney, Agent, or Firm* — Harness, Dickey & Pierce, P.L.C.

(57) ABSTRACT

The application provides a character correction method and apparatus, a device, and a storage medium, where the method including: obtaining position information of a click operation of a user on a terminal screen, and obtaining feature information of the click operation; determining distance information between the position information and each key on the terminal screen; determining transition probability information from a character indicated by a history click operation to a character corresponding to each key; determining a character prediction result according to the feature information, the distance information and the transition probability information, where the character prediction result comprises a probability score that the character indicated by the click operation belongs to the character corresponding to each key; and determining the character with a highest probability score as a correction character corresponding to the click operation.

17 Claims, 7 Drawing Sheets

(56) References Cited

U.S. PATENT DOCUMENTS

2013/0342463 A1    12/2013  Murase et al.
2016/0026258 A1*   1/2016   Ou .................... G06F 3/04883
                                                         715/773

FOREIGN PATENT DOCUMENTS

| CN | 103530057 A | 1/2014 |
| CN | 103605642 A | 2/2014 |
| CN | 104375665 A | 2/2015 |
| CN | 105431809 A | 3/2016 |

* cited by examiner

CHARACTER CORRECTION METHOD AND APPARATUS, DEVICE, AND STORAGE MEDIUM

CROSS-REFERENCE TO RELATED APPLICATION

This application claims priority to Chinese Patent Application No. 201811052131.9, filed on Sep. 10, 2018, which is hereby incorporated by reference in its entirety.

TECHNICAL FIELD

Embodiments of the present disclosure relate to the field of terminal technology, and in particular, to a character correction method and apparatus, a device, and a storage medium.

BACKGROUND

Terminal devices have become an important tool in the live and work of a user. Due to a volume limitation of the terminal device, in order to make a display area of the terminal device larger, an onscreen soft keyboard is provided, and the user can input a character into the terminal device by clicking the soft keyboard on the terminal screen. However, since a character area on the soft keyboard on the terminal screen is small, the user is likely to touch an area outside the character area in the process of clicking the character area, thereby inputting a wrong character, and then the user needs to delete the wrong character and re-input the character. As a result, the users input efficiency is low and the user experience is poor.

In the prior art, the character generated by the users click operation may be corrected. First, one or more strategies may be used to form a plurality of candidate characters for the character inputted by the user, then, a classifier is used to rate the candidate characters, and a candidate character with a highest score is used as a final correction character.

However, in the prior art, keyboard layouts of different on-terminal soft keyboards are different, and when the manner in the prior art is used for different terminals, a situation of correction error will occur, therefore, the character of the user's click operation cannot be correctly corrected.

SUMMARY

The embodiment of the present disclosure provides a character correction method and apparatus, a device, and a storage medium, in order to solve the problem that the character of the user's click operation cannot be correctly corrected in the above solution.

The first aspect of the present application provides a character correction method, including:

obtaining position information of a click operation of a user on a terminal screen, and obtaining feature information of the click operation, where the feature information includes at least one of following: a time interval between the click operation and a last click operation, a click pressure of the click operation, and a contact area of the click operation;

determining distance information between the position information and each key on the terminal screen;

determining, according to a preset probability dictionary matrix, transition probability information from a character indicated by a history click operation to a character corresponding to each key, where the probability dictionary matrix includes a transition probability between characters;

determining, according to the feature information, the distance information and the transition probability information, a character prediction result, where the character prediction result includes a probability score that the character indicated by the click operation belongs to the character corresponding to each key; and determining the character with a highest probability score as a correction character corresponding to the click operation.

Optionally, the distance information includes at least one of following: a first horizontal distance between the click operation and a key center, a first vertical distance between the click operation and the key center, a second horizontal distance between the click operation and a key boundary, and a second vertical distance between the click operation and the key boundary.

Optionally, the first horizontal distance $h_1=x-x'$, the first vertical distance $h_2=y-y'$;

when the position information is not inside the key, the second horizontal distance $h_3=\min(|x-x_1|,|x-x_2|)$, and the second vertical distance $h_4=\min(|y-y_1|,|y-y_2|)$; and when the position information is inside the key, the second horizontal distance $h_3=0$, and the second vertical distance $h_4=0$;

where x is a horizontal coordinate of the position information, and y is a vertical coordinate of the position information, x' is a horizontal coordinate of a center point of the key, y' is a vertical coordinate of the center point of the key, $x_1$ is a horizontal coordinate of a left boundary of the key, $x_2$ is a horizontal coordinate of a right boundary of the key, $y_1$ is a vertical coordinate of an upper boundary of the key, and $y_2$ is a vertical coordinate of a lower boundary of the key.

Optionally, the transition probability information is transition probability information from characters indicated by previous P click operations to the character corresponding to each key, where $P≥1$, and P is a positive integer.

Optionally, the determining, according to the feature information, the distance information and the transition probability information, a character prediction result, includes:

forming, according to the feature information, the distance information, and the transition probability information, a feature expression vector; and processing, according to a linear classifier, the feature expression vector to obtain the character prediction result.

Optionally, after the determining, according to the feature information, the distance information and the transition probability information, a character prediction result, the method further includes:

determining characters with probability scores ranked in top Q as candidate characters corresponding to the click operation, where $Q≥1$, and Q is a positive integer.

Optionally, after the determining, according to the feature information, the distance information and the transition probability information, a character prediction result, the method further includes:

obtaining character prediction results after the click operation is performed for N times, where $N≥1$, and N is a positive integer;

processing the character prediction results of a quantity of N using a beam search algorithm, to determine string sequences with combined probabilities ranked in top M, where each of the string sequences includes N characters, $M≥1$, and M is a positive integer;

re-ranking, according to the combined probabilities of the string sequences and other ranking information that is preset, the M string sequences, to obtain a ranking result, where the ranking result includes the M string sequences with ranking probabilities from large to small; and determining a string sequence ranked as first in the ranking result as a corrected string sequence.

Optionally, the other ranking information includes at least one of following:

a historical input frequency of the string, a string judgment result, an edit distances between the M string sequences and a correctly inputted string sequence; where the string judgment result indicates whether the M string sequences are in a preset dictionary.

Optionally, after re-ranking, according to the combined probabilities of the string sequences and other ranking information that is preset, the M string sequences, to obtain a ranking result, the method further includes:

determining string sequences ranked in top R in the ranking result as candidate string sequences, where $2 \leq R \leq M$, and R is a positive integer.

A second aspect of the present application provides a character correction apparatus, including:

a first obtaining module, configured to obtain position information of a click operation of a user on a terminal screen, and obtain feature information of the click operation, where the feature information includes at least one of following: a time interval between the click operation and a last click operation, a click pressure of the click operation, and a contact area of the click operation;

a first determining module, configured to determine distance information between the position information and each key on the terminal screen;

a second determining module, configured to determine, according to a preset probability dictionary matrix, transition probability information from a character indicated by a history click operation to a character corresponding to each key, where the probability dictionary matrix includes a transition probability between characters;

a third determining module, configured to determine, according to the feature information, the distance information and the transition probability information, a character prediction result, where the character prediction result includes a probability score that the character indicated by the click operation belongs to the character corresponding to each key; and a fourth determining module, configured to determine the character with a highest probability score as a correction character corresponding to the click operation.

Optionally, the distance information includes at least one of following: a first horizontal distance between the click operation and a key center, a first vertical distance between the click operation and the key center, a second horizontal distance between the click operation and a key boundary, and a second vertical distance between the click operation and the key boundary.

Optionally, the first horizontal distance $h_1=x-x'$, the first vertical distance $h_2=y'$;

when the position information is not inside the key, the second horizontal distance $h_3=\min(|x-x_1|,|x-x_2|)$, and the second vertical distance $h_4=\min(|y-y_1|,|y-y_2|)$; and when the position information is inside the key, the second horizontal distance $h_3=0$, and the second vertical distance $h_4=0$;

where x is a horizontal coordinate of the position information, and y is a vertical coordinate of the position information, x' is a horizontal coordinate of a center point of the key, y' is a vertical coordinate of the center point of the key, $x_1$ is a horizontal coordinate of a left boundary of the key, $x_2$ is a horizontal coordinate of a right boundary of the key, $y_1$ is a vertical coordinate of an upper boundary of the key, and $y_2$ is a vertical coordinate of a lower boundary of the key.

Optionally, the transition probability information is transition probability information from characters indicated by previous P click operations to the character corresponding to each key, where $P \geq 1$, and P is a positive integer.

Optionally, the third determining module includes:

a constructing submodule, configured to form, according to the feature information, the distance information, and the transition probability information, a feature expression vector; and a processing submodule, configured to process, according to a linear classifier, the feature expression vector to obtain the character prediction result.

Optionally, the apparatus further includes:

a fifth determining module, configured to determine characters with probability scores ranked in top Q as candidate characters corresponding to the click operation, where $Q \geq 1$, and Q is a positive integer, after the third determining module determines the character prediction result according to the feature information, the distance information and the transition probability information.

Optionally, the apparatus further includes:

a second obtaining module, configured to obtain character prediction results after the click operation is performed for N times, where $N \geq 1$, and N is a positive integer, after the third determining module determines a character prediction result according to the feature information, the distance information and the transition probability information;

a first ranking module, configured to process the character prediction results of a quantity of N using a beam search algorithm, to determine string sequences with combined probabilities ranked in top M, where each of the string sequences includes N characters, $M \geq 1$, and M is a positive integer;

a second ranking module, configured to re-rank, according to the combined probabilities of the string sequences and other ranking information that is preset, the M string sequences, to obtain a ranking result, where the ranking result includes the M string sequences with ranking probabilities from large to small; and a sixth determining module, configured to determine a string sequence ranked as first in the ranking result as a corrected string sequence.

Optionally, the other ranking information includes at least one of following:

a historical input frequency of the string, a string judgment result, an edit distances between the M string sequences and a correctly inputted string sequence; where the string judgment result indicates whether the M string sequences are in a preset dictionary.

Optionally, the apparatus further includes:

a seventh determining module, configured to determine string sequences ranked in top R in the ranking result as candidate string sequences, where $2 \geq R \geq M$, and R is a positive integer, after the second ranking module re-ranks the M string sequences according to the combined probabilities of the string sequences and other ranking information that is preset to obtain the ranking result.

The third aspect of the present application provides a terminal device, a transmitter, a receiver, a memory, and a processor;

the memory is configured to store a computer instruction; and the processor is configured to execute the computer instruction stored in the memory to implement the character correction method according to any one of the implementations of the first aspect.

A fourth aspect of the present application provides a readable storage medium and a computer instruction, where the computer instruction is stored in the readable storage medium; and the computer instruction is used for implementing the character correction method according to any one of the implementations of the first aspect.

According to the character correction method and apparatus, the device, and the storage medium provided by the embodiments of the present application, the position information of a user's click operation on the terminal screen is obtained, and the feature information of the click operation is obtained; the distance information between the position information and each key on the terminal screen is determined; the transition probability information from the character indicated by the history click operation to the character corresponding to each key is determined; the character prediction result is determined according to the feature information, the distance information, and the transition probability information, where the character prediction result includes the probability score that the character indicated by the click operation belongs to the character corresponding to each key; and the character with the highest probability score is used as the correction character corresponding to the click operation. Therefore, it is possible to determine which character the user indicates after each click operation performed by the user, and since the distance information between the click operation and each key on the terminal screen is utilized, the characters can be corrected based on the keyboard layout pattern of the soft keyboard on the terminal to avoid the situation where the correction error occurs in case of different terminals, and the character according to the user's click operation can be corrected correctly. Moreover, the computational complexity of the solution is smaller than that of the prior art, and the impact time is short, thereby the user experience can be improved. In addition, one model of the solution can be used for a variety of terminals and a variety of keyboard layouts, and it is not required to deploy multiple models for different devices, therefore, the installation package size is reduced, the deployment cost is reduced, and the storage space is saved, thereby the user experience can be further improved.

BRIEF DESCRIPTION OF THE DRAWINGS

In order to more clearly illustrate technical solutions in embodiments of the present application or the prior art, accompanying drawings required for describing the embodiments or the prior art will be briefly described below. Obviously, the accompanying drawings in the following description are some of the embodiments of the present application, and other drawings can be obtained by those skilled in the art based on these accompanying drawings without any creative effort.

DETAILED DESCRIPTION OF THE EMBODIMENTS

Figure 1:
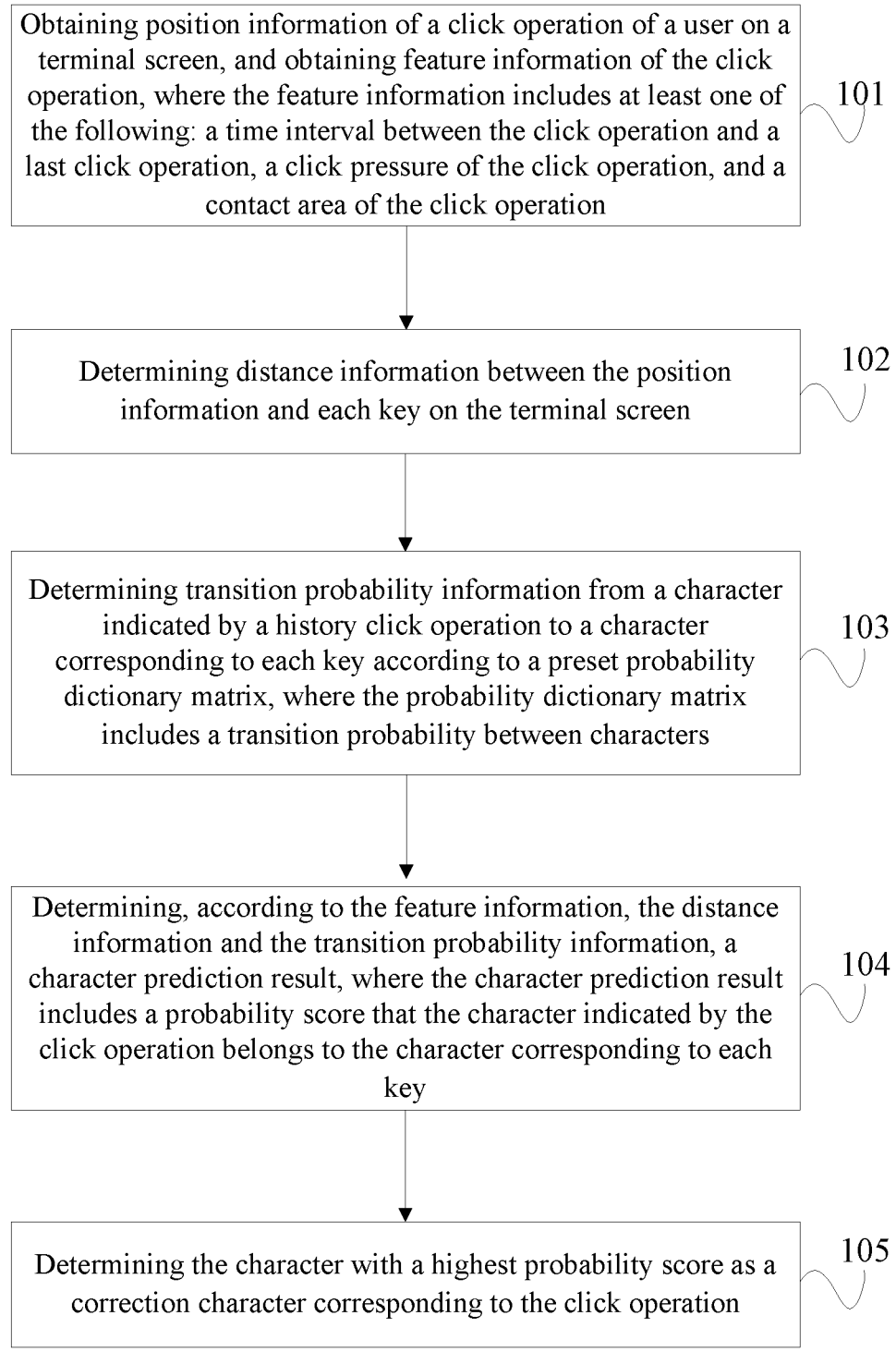
FIG. 1 is a flowchart of Embodiment 1 of a character correction method according to an embodiment of the present application.

In order to make the purpose, technical solutions and advantages of embodiments of the present application more clear, the technical solutions in the embodiments of the present application are clearly and completely described in the following with reference to accompanying drawings in the embodiments of the present application. Obviously, the described embodiments are some, instead of all, of the embodiments of the present application. Based on the embodiments in the present application, all other embodiments obtained by those skilled in the art without any creative effort are within the scope of the present application.

Terminal devices have become an important tool in the live and work of a user. Due to a volume limitation of the terminal device, in order to make a display area of the terminal device larger, an onscreen soft keyboard is provided, and the user can input a character into the terminal device by clicking the soft keyboard on the terminal screen. However, since a character area on the soft keyboard on the terminal screen is small, the user is likely to touch an area outside the character area in the process of clicking the character area, thereby inputting a wrong character, and then the user needs to delete the wrong character and re-input the character. As a result, the users input efficiency is low and the user experience is poor.

In the prior art, the character generated by the user's click operation may be corrected, specifically, in the prior art, candidate characters can be formed first, for example, one or more strategies may be used to form the candidate characters for the character; then a rating function (such as an edit distance) or a classifier (such as a support vector machine) is used, in combination with a local feature or a global feature of the character, to rate and rank the candidate characters to obtain a candidate character with a highest score; and the candidate character with the highest score is used as a correction character, that is, the candidate character with the highest score is used as a character to display to the user. There are several manners for generating the candidate characters: in a first manner is, a confusion set is used to obtain the candidate characters; in a second manner, a language model method and a confusion set are used to obtain the candidate characters; and in a third manner, a preset model is used to generate the candidate characters, where the preset model may be a hidden Markov model (HMM) or a model based on a graph model. There are several manners for rating and ranking the candidate characters: in a first manner, a language model is used to rank the candidate characters, for example, a forward algorithm and a character-level language model may be used to rank the candidate characters, for another example, a full-sentence language model may be used to rank the candidate characters; and in a second manner, a classifier may be used to rank the candidate characters, for example, a support vector machine may be used to rank the candidate characters.

However, in the prior art, keyboard layouts of different on-terminal soft keyboards are different, and when the manners in the prior art are used for different terminals, a situation of correction error will occur, therefore, the character of the user's click operation cannot be correctly corrected.

In view of the above problem, the present application provides a character correction method and apparatus, a device, and a storage medium, where the character may be corrected based on a keyboard layout of the soft keyboard on the terminal to avoid the situation where the correction error occurs in case of different terminals, and the character according to the user's click operation can be corrected correctly. The solution will be described in detail below through several specific embodiments.

FIG. 1 is a flowchart of Embodiment 1 of a character correction method according to an embodiment of the present application. As shown in FIG. 1, an executive body of the scheme is a terminal device, such as a mobile phone or a tablet computer. The character correction method includes:

S101: obtaining position information of a click operation of a user on a terminal screen, and obtaining feature information of the click operation, where the feature information includes at least one of the following: a time interval between the click operation and a last click operation, a click pressure of the click operation, and a contact area of the click operation.

In this step, specifically, when the user clicks the key on the terminal screen, the click operation of the user may be obtained, and the click operation indicates a click point. The position information $t=(x,y)$ of the click point of the user on the terminal screen is obtained, where x is a horizontal coordinate of the position information, y is a vertical coordinate of the position information.

And, while determining the position information t, other features of the user performing a current click operation on the terminal screen may be obtained. The other features include at least one of the following features: a time interval between the current click operation and a previous click operation, a key pressure, key contact area.

For example, for a two-dimensional coordinate system on the terminal screen, a horizontal direction of the terminal screen is an x-axis of the two-dimensional coordinate system, and a vertical direction of the terminal screen is a y-axis of the two-dimensional coordinate system. When the user clicks a key on the terminal screen, the position information $t=(x,y)$ of the user's click operation may be obtained, at the same time, the time interval T between the current click operation and the previous click operation, a pressure F of the current click operation, a contact area L between the user and the terminal screen under the current click operation may be obtained, where the pressure F of the current click operation is the above key pressure, the contact area L between the user and the terminal screen under the current click operation is the above key contact area.

S102: determining distance information between the position information and each key on the terminal screen.

Optionally, the distance information includes at least one of the following: a first horizontal distance between the click operation and a key center, a first vertical distance between the click operation and the key center, a second horizontal distance between the click operation and a key boundary, a second vertical distance between the click operation and the key boundary.

Optionally, the first horizontal distance $h_1=x-x'$, and the first vertical distance $h_2=y-y'$. When the position information is not inside the key, the second horizontal distance $h_3=\min(|x-x_1|,|x-x_2|)$, and the second vertical distance $h_4=\min(|y-y_1|,|y-y_2|)$; and when the position information is located inside the key, the second horizontal distance $h_3=0$, and the second vertical distance $h_4=0$. Here, x is the horizontal coordinate of the position information, y is the vertical coordinate of the position information, x' is a horizontal coordinate of a center point of the key, y' is a vertical coordinate of the center point of the key, $x_1$ is a horizontal coordinate of a left boundary of the key, $x_2$ is a horizontal coordinate of a right boundary of the key, $y_1$ is a vertical coordinate of an upper boundary of the key, and $y_2$ is a vertical coordinate of a lower boundary of the key.

Figure 2:
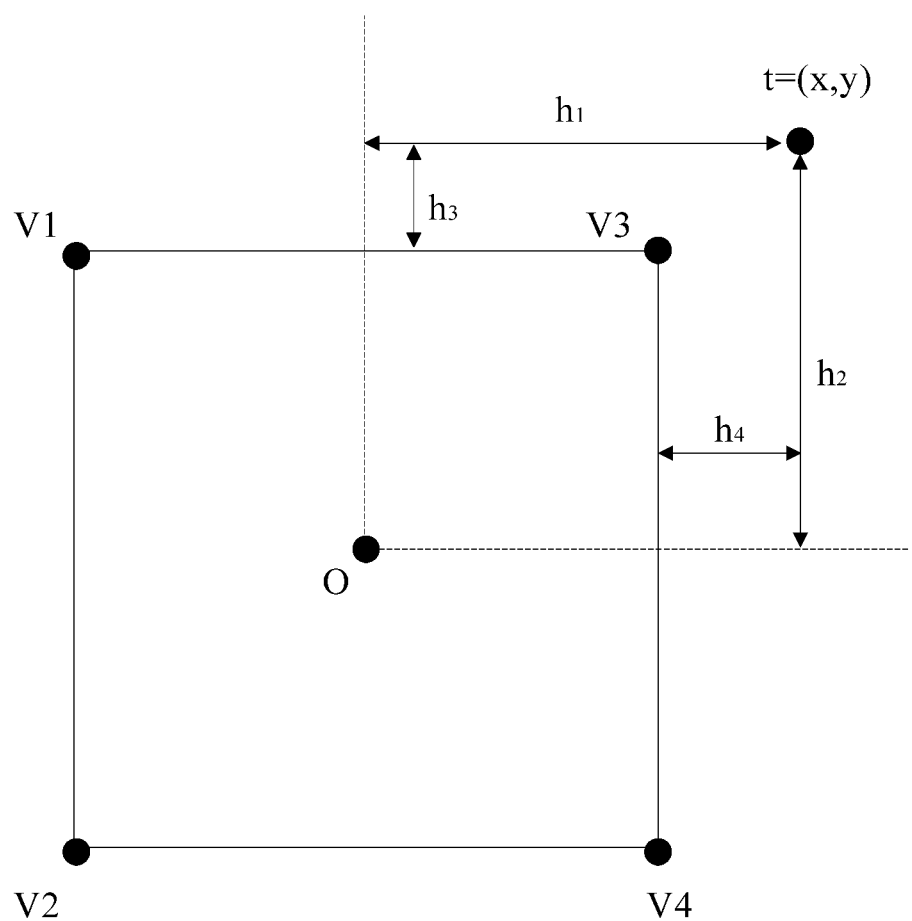
FIG. 2 is a schematic diagram of distance information in Embodiment 1 of a character correction method according to an embodiment of the present application.

In this step, specifically, FIG. 2 is a schematic diagram of distance information in Embodiment 1 of a character correction method according to an embodiment of the present application. As shown in FIG. 2, a two-dimensional coordinate system is established on the terminal screen, where a horizontal direction of the terminal screen is an x-axis of the two-dimensional coordinate system, a vertical direction of the terminal screen is a y-axis of the two-dimensional coordinate system, each key on the terminal screen has a center point O, and center point position information of the center point O of each key is $t'=(x',y')$, where x' is the horizontal coordinate of the center point of the key, and y' is the vertical coordinate of the center point O of the key. Each key has four vertices, V1, V2, V3, V4, and position information of V1 is $t1=(x_1,y_1)$, position information of V2 is $t2=(x_1,y_2)$, position information of V3 is $t3=(x_2,y_1)$, and position information of V4 is $t4=(x_2,y_2)$.

For each key on the terminal screen, each key has the left boundary, the right boundary, the upper boundary, and the lower boundary. For each point on the left boundary of the key, a horizontal coordinate is constant, and the horizontal coordinate of the left boundary of the key is $x_1$; for each point on the right boundary of the key, a horizontal coordinate is constant, and the horizontal coordinate of the right boundary of the key is $x_2$; for each point on the upper boundary of the key, a vertical coordinate is constant, and the vertical coordinate of the upper boundary of the key is $y_1$; and for each point on the lower boundary of the key, a vertical coordinate is constant, and the vertical coordinate of the lower boundary of the key is $y_2$.

The first horizontal distance $h_1=x-x'$ between the click operation and the center point of each key on the terminal screen, and the first vertical distance $h_2=y-y'$ between the click operation and the center point of each key on the terminal screen may be calculated.

For each key on the terminal screen, if the click operation is not clicked inside the key, it is determined that the position information of the click operation is not inside the key, then the second horizontal distance between the click operation and the key boundary may be calculated as $h_3=\min(|x-x_1|,|x-x_2|)$, and the second vertical distance between the click operation and the key boundary may be calculated as $h_4=\min(|y_1|,|y-y_2|)$. For each key on the terminal screen, if the click operation is clicked inside the key, it is determined that the position information of the click operation is located inside the key, then the second horizontal distance between the click operation and the key boundary may be calculated as $h_3=0$, and the second vertical distance between the click operation and the key boundary may be calculated as $h_4=0$.

The distance information calculated above can indicate the relationship between the position of the click operation and the keyboard layout of the terminal.

For example, there are 26 English alphabet keys on the terminal screen, and there is also 1 non-character selection key on the terminal screen, that is, the terminal screen displays a total of 27 keys. Based on the position information t=(x,y) of the user's current click action, the first horizontal distance, the first vertical distance, the second horizontal distance and the second vertical distance between the click operation and each key may be calculated. Because the four distances are calculated for each key, a 27*4 distance vector can be obtained.

S103: determining transition probability information from a character indicated by a history click operation to a character corresponding to each key according to a preset probability dictionary matrix, where the probability dictionary matrix includes a transition probability between characters.

Optionally, the transition probability information is transition probability information from characters indicated by previous P click operations to the character corresponding to each key, where P≥1, and P is a positive integer.

In this step, specifically, the user's history click operation is obtained, and the history click operation indicates characters of the previous P click operations before the user performs the current click operation.

The probability dictionary matrix is generated based on the historical click operations of multiple users, and the probability dictionary matrix includes the transition probability between the characters, specifically, the probability dictionary matrix includes the transition probability from each character to a next character, and the transition probability of every two characters to a next character. The probability dictionary matrix indicates Z characters, 1 non-character and a complement character '$', for example, a value of Z is 26.

According to the probability dictionary matrix, the transition probability information from the character indicated by the current user's history click operation to the character corresponding to each key on the terminal screen may be determined. The transition probability information includes the transition probability from the previous character clicked by the user to the character corresponding to each key, the transition probability from the previous two characters clicked by the user to the character corresponding to each key. When there is only one history click or two history clicks in the current user's history click operation, the complement character '$' may be used as the history click operation of the current user, and then the transition probability information is calculated.

For example, there are 26 English alphabet keys on the terminal screen, and there is also 1 non-character selection key on the terminal screen, that is, a total of 27 keys are displayed on the terminal screen. The transition probability from the previous character clicked by the user to the corresponding character of each key is determined, and the transition probability from the previous two characters clicked by the user to the character corresponding to each key is determined; the transition probability from the previous character to each key forms a vector with a dimension of 27; and the transition probability from the previous two characters to the corresponding character of each key forms a vector with a dimension of 27. Thus, the transition probability information from the character indicated by the history click operation to the character corresponding to each key forms a vector with a dimension of 27+27.

S104: determining, according to the feature information, the distance information and the transition probability information, a character prediction result, where the character prediction result includes a probability score that the character indicated by the click operation belongs to the character corresponding to each key.

In this step, specifically, the probability score that the character indicated by the click operation belongs to the character corresponding to each key may be calculated based on the first horizontal distance, the first vertical distance, the second horizontal distance, and the second vertical distance between the click operation and each key, the feature information, the transition probability from the previous character clicked by the user to the corresponding character of each key, and the transition probability from the previous two characters clicked by the user to the corresponding character of each key.

For example, there are 26 English alphabet keys on the terminal screen, and there is also a 1 non-character selection key on the terminal screen, that is, a total of 27 keys are displayed on the terminal screen. The character prediction result may be obtained, and the character prediction result includes 27 probability scores, and each score is the probability score that the character indicated by the click operation belongs to a character corresponding to a key.

S105: determining the character with a highest probability score as a correction character corresponding to the click operation.

In this step, specifically, the character with the highest probability score in the character prediction result is used as the character obtained after the click operation of the user is corrected, and then the character is displayed to the user.

In this embodiment, the position information of a user's click operation on the terminal screen is obtained, and the feature information of the click operation is obtained; the distance information between the position information and each key on the terminal screen is determined; the transition probability information from the character indicated by the history click operation to the character corresponding to each key is determined; the character prediction result is determined according to the feature information, the distance information, and the transition probability information, where the character prediction result includes the probability score that the character indicated by the click operation belongs to the character corresponding to each key; and the character with the highest probability score is used as the correction character corresponding to the click operation. Therefore, it is possible to determine which character the user indicates after each click operation performed by the user, and since the distance information between the click operation and each key on the terminal screen is utilized, the characters can be corrected based on the keyboard layout pattern of the soft keyboard on the terminal to avoid the situation where the correction error occurs in case of different terminals, and the character according to the user's click operation can be corrected correctly. Moreover, the computational complexity of the solution is smaller than that of the prior art, and the impact time is short, thereby the user experience can be improved. In addition, one model of the solution can be used for a variety of terminals and a variety of keyboard layouts, and it is not required to deploy multiple models for different devices, therefore, the installation package size is reduced, the deployment cost is reduced, and the storage space is saved, thereby the user experience can be further improved.

Figure 3:
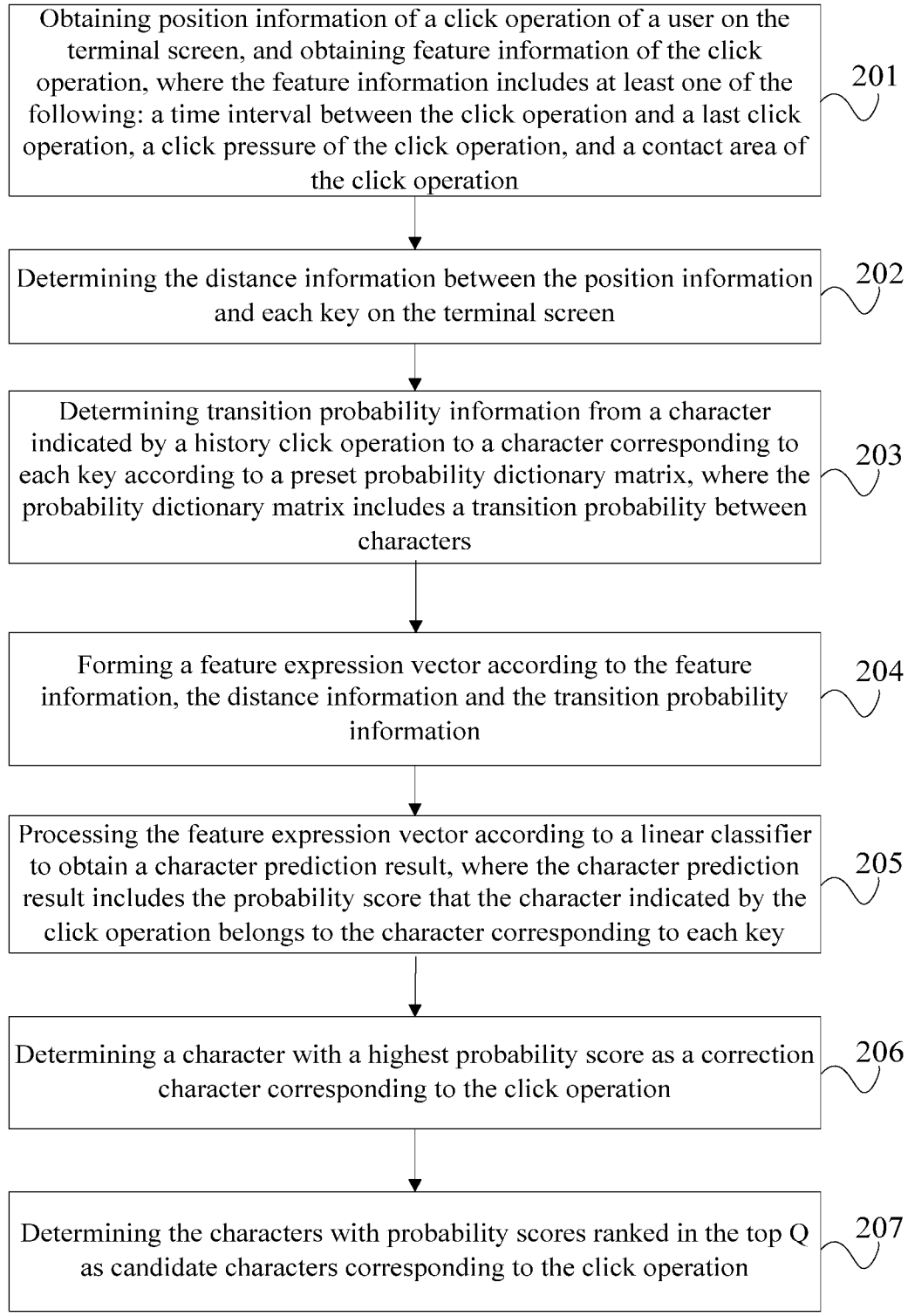
FIG. 3 is a flowchart of Embodiment 2 of a character correction method according to an embodiment of the present application.

FIG. 3 is a flowchart of Embodiment 2 of a character correction method according to an embodiment of the present application, as shown in FIG. 3, an executive body of the solution is a terminal device, such as a mobile phone or a tablet computer. The character correction method includes:

S201, obtaining position information of a click operation of a user on the terminal screen, and obtaining feature information of the click operation, where the feature information includes at least one of the following: a time interval between the click operation and a last click operation, a click pressure of the click operation, and a contact area of the click operation.

In this embodiment, specifically, this step may refer to the step 101 of FIG. 1, and will not be described again.

S202, determining the distance information between the position information and each key on the terminal screen.

In this embodiment, specifically, the step may refer to the step 102 of FIG. 1, and will not be described again.

S203, determining transition probability information from a character indicated by a history click operation to a character corresponding to each key according to a preset probability dictionary matrix, where the probability dictionary matrix includes a transition probability between characters.

In this embodiment, specifically, the step may refer to the step 103 of FIG. 1, and will not be described again.

S204, forming a feature expression vector according to the feature information, the distance information and the transition probability information.

In this embodiment, specifically, the feature information includes a time interval between the current click operation and the previous click operation, a key pressure, and a key contact area, where the time interval is a vector with a dimension of 1, the key pressure is a vector with dimension 1, the key contact area is a vector with dimension 1, thus the feature information is a vector with a dimension of 3.

The distance information between the position information of the click operation and a key on the terminal screen is a vector with a dimension of 4, thus, the distance information between the position information of the click operation and all keys on the terminal screen constitutes a vector of dimension R*4, where R is the number of keys on the terminal screen.

The transition probability information from the character indicated by the history click operation to the character corresponding to each key forms a vector of dimension R+R, where R is the number of keys on the terminal screen.

The feature information, all of the distance information and all of the transition probability information described above may be combined into one feature expression vector.

S205: processing the feature expression vector according to a linear classifier, to obtain a character prediction result, where the character prediction result includes the probability score that the character indicated by the click operation belongs to the character corresponding to each key.

In this embodiment, specifically, the feature expression vector in step S204 is processed by using the linear classifier in the prior art to obtain the character prediction result.

S206: determining a character with a highest probability score as a correction character corresponding to the click operation.

In this embodiment, specifically, the step may refer to step 105 of FIG. 1, and will not be described again.

S207, determining the characters with probability scores ranked in the top Q as candidate characters corresponding to the click operation, where Q≥1, and Q is a positive integer.

In this embodiment, specifically, the characters with probabilities ranked in the top Q in the character prediction result are displayed as the candidate characters.

In this embodiment, it is possible to determine which character the user indicates after each click operation performed by the user, and since the distance information between the click operation and each key on the terminal screen is utilized, the characters can be corrected based on the keyboard layout pattern of the soft keyboard on the terminal to avoid the situation where the correction error occurs in case of different terminals, and the character according to the user's click operation can be corrected correctly. Moreover, the computational complexity of the solution is smaller than that of the prior art, and the impact time is short, thereby the user experience can be improved. In addition, one model of the solution can be used for a variety of terminals and a variety of keyboard layouts, and it is not required to deploy multiple models for different devices, therefore, the installation package size is reduced, the deployment cost is reduced, and the storage space is saved, thereby the user experience can be further improved.

Figure 4:
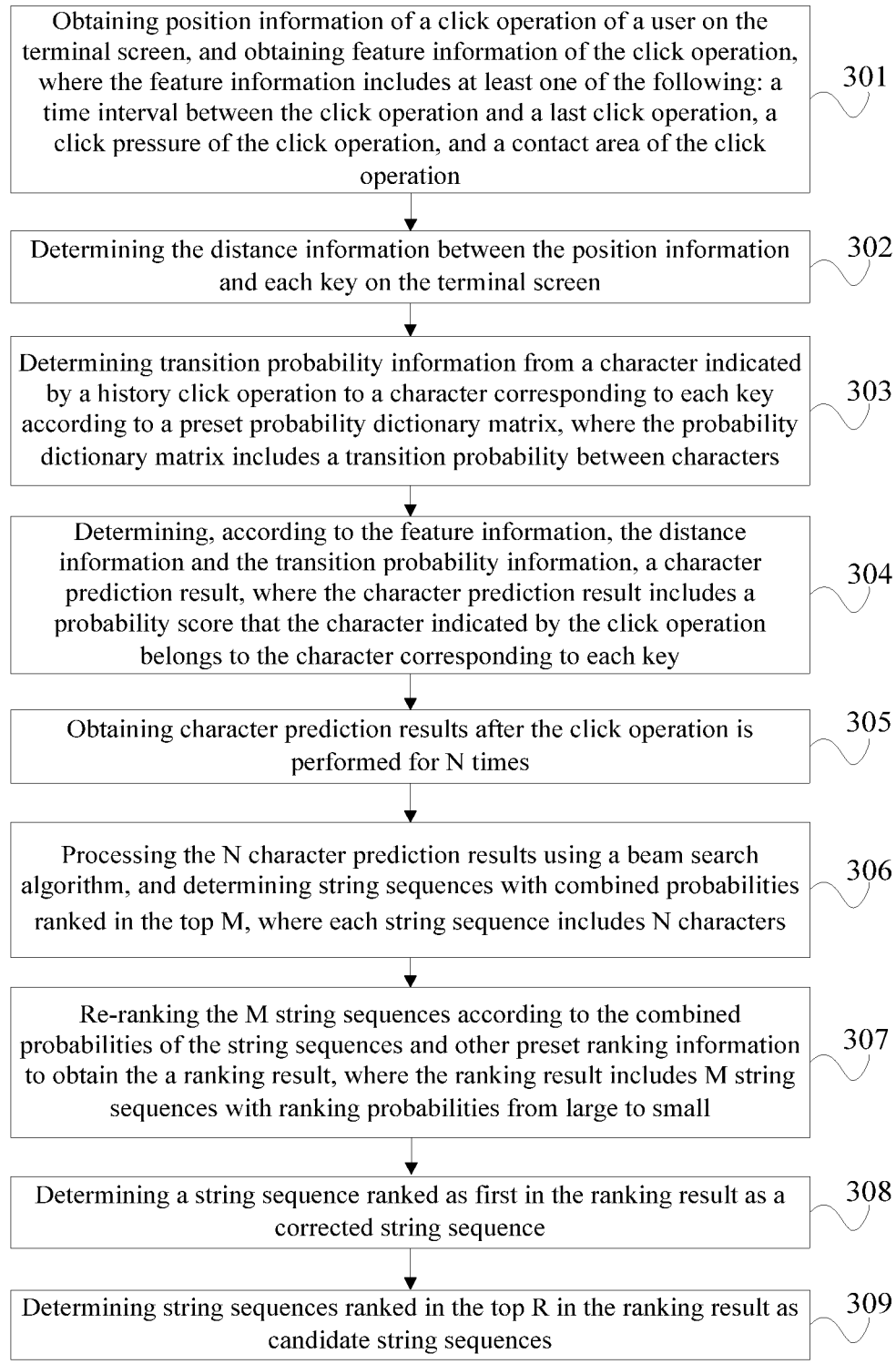
FIG. 4 is a flowchart of Embodiment 3 of a character correction method according to an embodiment of the present application.

FIG. 4 is a flowchart of Embodiment 3 of a character correction method according to an embodiment of the present application, as shown in FIG. 4, an executive body of the solution is a terminal device, such as a mobile phone or a tablet computer. The character correction method includes:

S301, obtaining position information of a click operation of a user on the terminal screen, and obtaining feature information of the click operation, where the feature information includes at least one of the following: a time interval between the click operation and a last click operation, a click pressure of the click operation, and a contact area of the click operation.

In this embodiment, specifically, this step may refer to the step 101 of FIG. 1, and will not be described again.

S302, determining the distance information between the position information and each key on the terminal screen.

In this embodiment, specifically, the step may refer to the step 102 of FIG. 1, and will not be described again.

S303, determining transition probability information from a character indicated by a history click operation to a character corresponding to each key according to a preset probability dictionary matrix, where the probability dictionary matrix includes a transition probability between characters.

In this embodiment, specifically, the step may refer to the step 103 of FIG. 1, and will not be described again.

S304, determining a character prediction result according to the feature information, the distance information and the transition probability information, where the character prediction result includes a probability score that the character indicated by the click operation belongs to the character corresponding to each key.

In this embodiment, specifically, the step may refer to the step 104 of FIG. 1, and will not be described again.

S305: obtaining character prediction results after the click operation is performed for N times, where N≥1, and N is a positive integer.

In this embodiment, specifically, each time the user performs a click operation, steps S301-S304 are performed in sequence. N character prediction results may be obtained after the user has performed N click operations.

S306: processing the N character prediction results using a beam search algorithm, and determining string sequences with combined probabilities ranked in the top M, where each string sequence includes N characters, M≥1, and M is a positive integer.

In this embodiment, specifically, the characters in the N character prediction results are ranked using the existing beam search algorithm, further, a string sequence is formed by selecting one character from each character prediction result and the combined probability of each string sequence is obtained; the string sequences with combined probabilities ranked in the top M are determined. Since the user performs the click operation for N times, each string sequence includes N characters.

The beam search algorithm is a greedy algorithm, also known as a directional search algorithm, which explores the solution space by extending the most promising partial solutions in a finite set, and it is a heuristic method for breadth-first search.

For example, the user performs the click operation for N times and inputs N characters, and N character prediction results may be obtained, there are 27 character probability scores in each character's prediction result. The N characters are combined, starting from a first character, into a string of N characters using the beam search algorithm. The combination is performed for multiple times, and in each process of the combination, the best M results of the previous combinations and all the results of the characters (i.e., M*27 combinations) are ranked, and the best M results as possible results for the current combination. Finally, the string sequences with the combined probabilities ranked in the top M are obtained.

Fewer times of ranking are required to perform when the beam search algorithm is used to combine and rank the characters in the N character prediction results, which can improve the operation efficiency.

S307: re-ranking the M string sequences according to the combined probabilities of the string sequences and other preset ranking information to obtain the a ranking result, where the ranking result includes M string sequences with ranking probabilities from large to small.

Optionally, other ranking information includes at least one of the following: a historical input frequency of the string, a string judgment result, edit distances between the M string sequences and correctly inputted string sequences, where the string judgment result indicates whether the M string sequences are in the preset dictionary.

In this embodiment, specifically, the other ranking information may be obtained, where the other ranking information includes the historical input frequency of the string, the string judgment result, the edit distances between the M string sequences and the correctly inputted string sequences. The historical input frequency of the string includes the history input frequency of the current user and the historical input frequencies of other users; the string judgment result indicates whether the M string sequences are in the preset dictionary; and the correctly inputted string sequence is the correct sequence of characters without being corrected.

Then, the characters in the M string sequences are ranked using a ranking algorithm according to the combined probabilities of the M string sequences and other preset ranking information, and the ranking probability of each string sequence in the M string sequence is determined, and then the M string sequences with large to small ranking probabilities are taken as the final ranking result. The ranking algorithm may be a Lambda rank algorithm, or the ranking algorithm may be a pair-wise ranking algorithm.

S308: determining a string sequence ranked as first in the ranking result as a corrected string sequence.

In this embodiment, specifically, after the step S307, the string sequence ranked as first is taken as the corrected string sequence, and the corrected string sequence is displayed.

For example, the click operation is performed by the user for N times, M string sequences containing N characters are obtained, and the string sequence ranked as first is taken as the corrected string sequence.

S309: determining string sequences ranked in the top R in the ranking result as candidate string sequences, where $2 \leq R \leq M$, and R is a positive integer.

In this embodiment, specifically, the string sequences ranked the top 2 to the top R in the ranking result will also be displayed.

In this embodiment, after the user performs the click operation for N times, N character prediction results are obtained, the M string sequences with the largest combined probabilities are obtained using the beam search algorithm according to the N character prediction results, then the M string sequences are re-ranked according to the combined probabilities of the M string sequences and other ranking information, to M string sequences with ranking probabilities from large to small, and the string sequence ranked as first in the M string sequences is taken as the corrected string sequence. Therefore, it can be determined which string that the string inputted by the user input is, after the user performs the click operation for multiple times. And since the distance information between the click operation and each key on the terminal screen is utilized, the characters can be corrected based on the keyboard layout pattern of the soft keyboard on the terminal to avoid the situation where the correction error occurs in case of different terminals, and the character according to the user's click operation can be corrected correctly. Moreover, the computational complexity of the solution is smaller than that of the prior art, and the impact time is short, thereby the user experience can be improved. In addition, one model of the solution can be used for a variety of terminals and a variety of keyboard layouts, and it is not required to deploy multiple models for different devices, therefore, the installation package size is reduced, the deployment cost is reduced, and the storage space is saved, thereby the user experience can be further improved.

Figure 5:
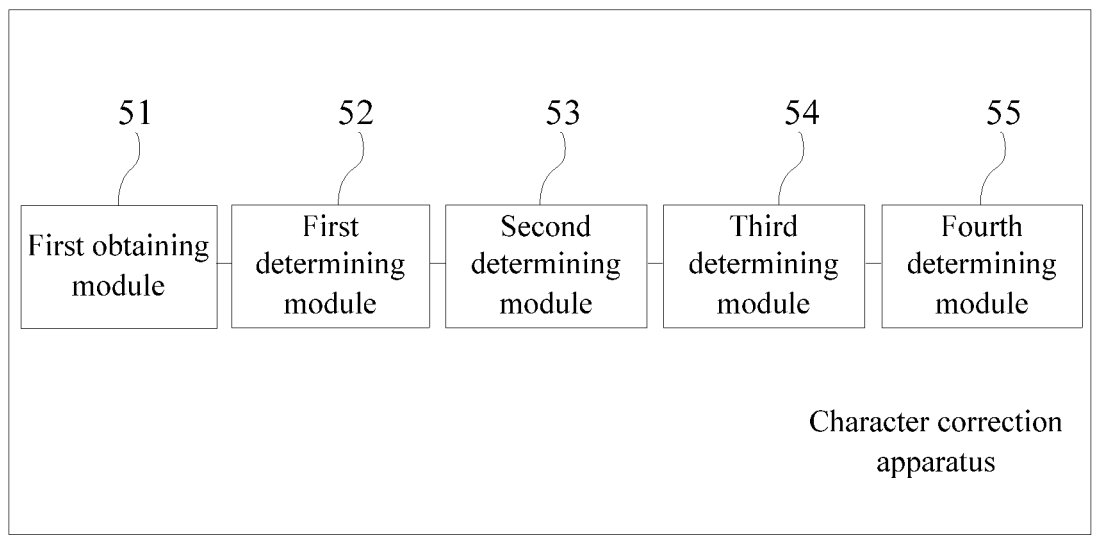
FIG. 5 is a schematic structural diagram of Embodiment 1 of a character correction apparatus according to an embodiment of the present application.

FIG. 5 is a schematic structural diagram of Embodiment 1 of a character correction apparatus according to an embodiment of the present application, as shown in FIG. 5, the character correction apparatus according to this embodiment includes:

a first obtaining module 51, configured to obtain position information of a click operation of a user on a terminal screen, and obtain feature information of the click operation, where the feature information includes at least one of the following: a time interval between the click operation and a last click operation, a click pressure of the click operation, and a contact area of the click operation;

a first determining module 52, configured to determine distance information between the position information and each key on the terminal screen;

a second determining module 53, configured to determine, according to a preset probability dictionary matrix, transition probability information from a character indicated by a history click operation to a character corresponding to each key, where the probability dictionary matrix includes a transition probability between characters;

a third determining module 54, configured to determine, according to the feature information, the distance information and the transition probability information, a character prediction result, where the character prediction result includes a probability score that the character indicated by the click operation belongs to the character corresponding to each key; and a fourth determining module 55, configured to determine the character with a highest probability score as a correction character corresponding to the click operation.

The character correction apparatus according to this embodiment is the same as the technical solution in the character correction method according to any one of the foregoing embodiments, and its implementation principle and technical effect are similar, and will not be described again.

Figure 6:
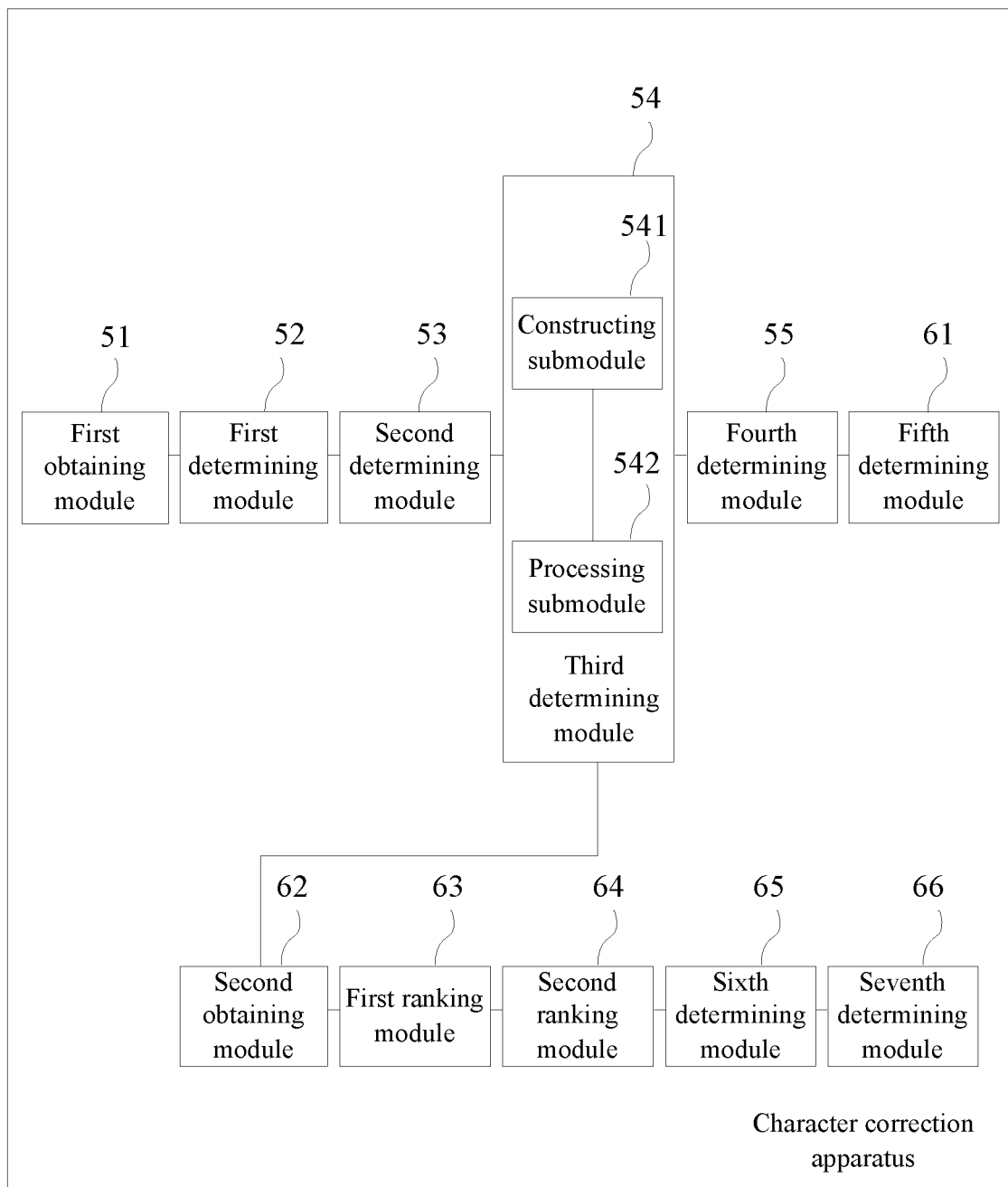
FIG. 6 is a schematic structural diagram of Embodiment 2 of a character correction apparatus according to an embodiment of the present application.

FIG. 6 is a schematic structural diagram of Embodiment 2 of a character correction apparatus according to an embodiment of the present application, on the basis of the embodiment shown in FIG. 5, as shown in FIG. 6, in the character correction apparatus according to this embodiment, the distance information includes at least one of the following: a first horizontal distance between the click operation and a key center, a first vertical distance between the click operation and the key center, a second horizontal distance between the click operation and a key boundary, and a second vertical distance between the click operation and the key boundary.

The first horizontal distance $h_1=x-x'$, the first vertical distance $h_2=y-y'$. And when the position information is not inside the key, the second horizontal distance $h_3=\min(|x-x_1|,|x-x_2|)$, and the second vertical distance $h_4=\min(|y-y_1|,|y-y_2|)$; and when the position information is inside the key, the second horizontal distance $h_3=0$, and the second vertical distance $h_4=0$; where x is a horizontal coordinate of the position information, and y is a vertical coordinate of the position information, x' is a horizontal coordinate of a center point of the key, y' is a vertical coordinate of the center point of the key, $x_1$ is a horizontal coordinate of a left boundary of the key, $x_2$ is a horizontal coordinate of a right boundary of the key, $y_1$ is a vertical coordinate of an upper boundary of the key, and $y_2$ is a vertical coordinate of a lower boundary of the key.

The transition probability information is transition probability information from characters indicated by previous P click operations to the character corresponding to each key, where P≥1, and P is a positive integer.

The third determining module 54, includes:

a constructing submodule 541, configured to form a feature expression vector according to the feature information, the distance information, and the transition probability information;

a processing submodule 542, configured to process the feature expression vector according to the linear classifier to obtain a character prediction result.

The character correction apparatus according to this embodiment further includes:

a fifth determining module 61, configured to determine characters with probability scores ranked in the top Q as candidate characters corresponding to the click operation, where Q≥1, and Q is a positive integer, after the third determining module determines the character prediction result according to the feature information, the distance information and the transition probability information.

The character correction apparatus according to this embodiment further includes:

a second obtaining module 62, configured to obtain character prediction results after the click operation is performed for N times, where N≥1, and N is a positive integer, after the third determining module determines a character prediction result according to the feature information, the distance information and the transition probability information;

a first ranking module 63, configured to process the character prediction results of a quantity of N using a beam search algorithm, to determine string sequences with combined probabilities ranked in the top M, where each of the string sequences includes N characters, M≥1, and M is a positive integer;

a second ranking module 64, configured to re-rank, according to the combined probabilities of the string sequences and other ranking information that is preset, the M string sequences, to obtain a ranking result, where the ranking result includes the M string sequences with ranking probabilities from large to small; and a sixth determining module 65, configured to determine a string sequence ranked as first in the ranking result as a corrected string sequence.

The other ranking information includes at least one of the following: a historical input frequency of the string, a string judgment result, an edit distances between the M string sequences and a correctly inputted string sequence; where the string judgment result indicates whether the M string sequences are in a preset dictionary.

The character correction apparatus according to this embodiment further includes:

a seventh determining module 66, configured to determine string sequences ranked in the top R in the ranking result as candidate string sequences, where 2≤R≤M, and R is a positive integer, after the second ranking module re-ranks the M string sequences according to the combined probabilities of the string sequences and other ranking information that is preset to obtain the ranking result.

The character correction apparatus according to this embodiment is the same as the technical solution in the character correction method according to any one of the foregoing embodiments, and its implementation principle and technical effect are similar, and will not be described again.

Figure 7:
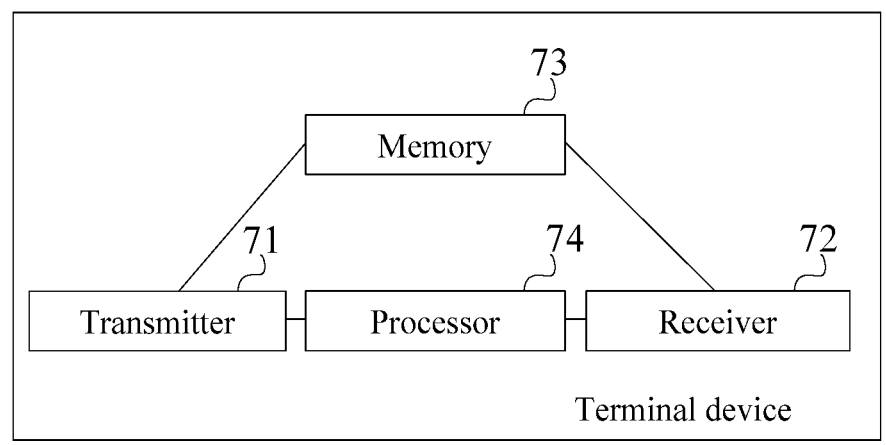
FIG. 7 is a schematic structural diagram of Embodiment 1 of a terminal device according to an embodiment of the present application.

FIG. 7 is a schematic structural diagram of Embodiment 1 of a terminal device according to an embodiment of the present application, as shown in FIG. 7, the terminal device, includes: a transmitter 71, a receiver 72, a memory 73, and a processor 74.

The memory 73 is configured to store computer instructions; the processor 74 is configured to store a computer instruction; and the processor is configured to execute the computer instruction stored in the memory to implement the character correction method according to any one of the foregoing embodiments.

The application also provides a storage medium, where including: a readable storage medium and a computer instruction, where the computer instruction is stored in the readable storage medium; and the computer instruction is used for implementing the character correction method according to any one of the implementations provided in the foregoing embodiments.

In the specific implementation of the foregoing terminal device, it should be understood that the processor 74 may be a central processing unit (CPU), or other general-purpose processor, a digital signal processor (DSP), an application specific integrated circuit (ASIC), etc. The general purpose processor may be a microprocessor, or the processor may be any conventional processor and the like. The steps of the methods disclosed in the embodiments of the present application may be directly implemented by a hardware processor, or may be performed by using a combination of hardware and software modules in the processor.

One of ordinary skill in the art can understand that all or some of the steps for implementing the foregoing method embodiments may be performed by hardware related to the program instructions. The foregoing program may be stored in a computer readable storage medium. When the program is executed, the steps including the above method embodiments are performed. The foregoing storage medium includes: a read-only memory (ROM), a RAM, a flash memory, a hard disk, a solid state hard disk, a magnetic tape, a floppy disk, an optical disc and any combination thereof.

Finally, it should be noted that the above embodiments are only used to illustrate, not limit, the technical solutions of the present application. Although the present application has been described in detail with reference to the foregoing embodiments, those skilled in the art should understand that the technical solutions described in the foregoing embodiments may still be modified, or some or all of the technical features may be equivalently substituted, and those modifications or substitutions do not make the essence of the corresponding technical solutions deviate from the scope of the technical solutions of the embodiments of the present application.

What is claimed is:

1. A character correction method, comprising:
   obtaining position information of a click operation of a user on a terminal screen, and obtaining feature information of the click operation, wherein the feature information comprises at least one of the following: a time interval between the click operation and a last click operation, a click pressure of the click operation, and a contact area of the click operation;
   determining distance information between the position information and each key on the terminal screen;
   determining, according to a preset probability dictionary matrix, transition probability information from a character indicated by a history click operation to a character corresponding to each key, wherein the probability dictionary matrix comprises a transition probability between characters;
   determining, according to the feature information, the distance information and the transition probability information, a character prediction result, wherein the character prediction result comprises a probability score that the character indicated by the click operation belongs to the character corresponding to each key; and
   determining the character with a highest probability score as a correction character corresponding to the click operation;
   after the determining, according to the feature information, the distance information and the transition probability information, a character prediction result, the method further comprises:
   obtaining character prediction results after the click operation is performed for N times, wherein N≥1, and N is a positive integer;
   processing the character prediction results of a quantity of N using a beam search algorithm, to determine string sequences with combined probabilities ranked in top M, wherein each of the string sequences comprises N characters, M≥1, and M is a positive integer;
   re-ranking, according to the combined probabilities of the string sequences and other ranking information that is preset, the M string sequences, to obtain a ranking result, wherein the ranking result comprises the M string sequences with ranking probabilities from large to small; and
   determining a string sequence ranked as first in the ranking result as a corrected string sequence.

2. The method according to claim 1, wherein the distance information comprises at least one of following: a first horizontal distance between the click operation and a key center, a first vertical distance between the click operation and the key center, a second horizontal distance between the click operation and a key boundary, and a second vertical distance between the click operation and the key boundary.

3. The method according to claim 2, wherein the first horizontal distance $h_1$=x−x', the first vertical distance $h_2$=y−y';
   when the position information is not inside the key, the second horizontal distance $h_3$=min(|x−$x_1$|,|x−$x_2$|), and the second vertical distance $h_4$=min(|y−$y_1$|,|y−$y_2$|); and
   when the position information is inside the key, the second horizontal distance $h_3$=0, and the second vertical distance $h_4$=0;
   wherein x is a horizontal coordinate of the position information, and y is a vertical coordinate of the position information, x' is a horizontal coordinate of a center point of the key, y' is a vertical coordinate of the center point of the key, $x_1$ is a horizontal coordinate of a left boundary of the key, $x_2$ is a horizontal coordinate of a right boundary of the key, $y_1$ is a vertical coordinate of an upper boundary of the key, and $y_2$ is a vertical coordinate of a lower boundary of the key.

4. The method according to claim 1, wherein the transition probability information is transition probability information from characters indicated by previous P click operations to the character corresponding to each key, wherein P≥1, and P is a positive integer.

5. The method according to claim 1, wherein the determining, according to the feature information, the distance information and the transition probability information, a character prediction result, comprises:
   forming, according to the feature information, the distance information, and the transition probability information, a feature expression vector; and
   processing, according to a linear classifier, the feature expression vector to obtain the character prediction result.

6. The method according to claim 1, wherein after the determining, according to the feature information, the distance information and the transition probability information, a character prediction result, the method further comprises:
   determining characters with probability scores ranked in top Q as candidate characters corresponding to the click operation, wherein Q≥1, and Q is a positive integer.

7. The method according to claim 1, wherein the other ranking information comprises at least one of following:
   a historical input frequency of the string, a string judgment result, an edit distances between the M string sequences and a correctly inputted string sequence; wherein the string judgment result indicates whether the M string sequences are in a preset dictionary.

8. The method according to claim 1, wherein after re-ranking, according to the combined probabilities of the string sequences and other ranking information that is preset, the M string sequences, to obtain a ranking result, the method further comprises:
   determining string sequences ranked in top R in the ranking result as candidate string sequences, wherein 2≤R≤M, and R is a positive integer.

9. A character correction apparatus, comprising: a processor and a non-transitory computer-readable medium for storing program codes, which, when executed by the processor, cause the processor to:
   obtain position information of a click operation of a user on a terminal screen, and obtain feature information of the click operation, wherein the feature information comprises at least one of following: a time interval between the click operation and a last click operation, a click pressure of the click operation, and a contact area of the click operation;

determine distance information between the position information and each key on the terminal screen;

determine, according to a preset probability dictionary matrix, transition probability information from a character indicated by a history click operation to a character corresponding to each key, wherein the probability dictionary matrix comprises a transition probability between characters;

determine, according to the feature information, the distance information and the transition probability information, a character prediction result, wherein the character prediction result comprises a probability score that the character indicated by the click operation belongs to the character corresponding to each key; and determine the character with a highest probability score as a correction character corresponding to the click operation;

the program codes further cause the processor to:

obtain character prediction results after the click operation is performed for N times, wherein N≥1, and N is a positive integer, after the third determining module determines a character prediction result according to the feature information, the distance information and the transition probability information;

process the character prediction results of a quantity of N using a beam search algorithm, to determine string sequences with combined probabilities ranked in top M, wherein each of the string sequences comprises N characters, M≥1, and M is a positive integer;

re-rank, according to the combined probabilities of the string sequences and other ranking information that is preset, the M string sequences, to obtain a ranking result, wherein the ranking result comprises the M string sequences with ranking probabilities from large to small; and determine a string sequence ranked as first in the ranking result as a corrected string sequence.

10. The apparatus according to claim 9, wherein the distance information comprises at least one of following: a first horizontal distance between the click operation and a key center, a first vertical distance between the click operation and the key center, a second horizontal distance between the click operation and a key boundary, and a second vertical distance between the click operation and the key boundary.

11. The apparatus according to claim 10, wherein the first horizontal distance $h_1=x-x'$, the first vertical distance $h_2=y-y'$;

when the position information is not inside the key, the second horizontal distance $h_3=(|x_1-x_1|,|x-x_2|)$, and the second vertical distance $h_4=\min(|y-y_1|,|y-y_2|)$; and when the position information is inside the key, the second horizontal distance $h_3=0$, and the second vertical distance $h_4=0$;

wherein x is a horizontal coordinate of the position information, and y is a vertical coordinate of the position information, x' is a horizontal coordinate of a center point of the key, y' is a vertical coordinate of the center point of the key, $x_1$ is a horizontal coordinate of a left boundary of the key, $x_2$ is a horizontal coordinate of a right boundary of the key, $y_1$ is a vertical coordinate of an upper boundary of the key, and $y_2$ is a vertical coordinate of a lower boundary of the key.

12. The apparatus according to claim 9, wherein the transition probability information is transition probability information from characters indicated by previous P click operations to the character corresponding to each key, wherein P≥1, and P is a positive integer.

13. The apparatus according to claim 9, wherein the program codes further cause the processor to:

form, according to the feature information, the distance information, and the transition probability information, a feature expression vector; and process, according to a linear classifier, the feature expression vector to obtain the character prediction result.

14. The apparatus according to claim 9, wherein the program codes further cause the processor to:

determine characters with probability scores ranked in top Q as candidate characters corresponding to the click operation, wherein Q≥1, and Q is a positive integer, after the third determining module determines the character prediction result according to the feature information, the distance information and the transition probability information.

15. The apparatus according to claim 9, wherein the other ranking information comprises at least one of following:

a historical input frequency of the string, a string judgment result, an edit distances between the M string sequences and a correctly inputted string sequence; wherein the string judgment result indicates whether the M string sequences are in a preset dictionary.

16. The apparatus according to claim 9, wherein the program codes further cause the processor to:

determine string sequences ranked in top R in the ranking result as candidate string sequences, wherein 2≤R≤M, and R is a positive integer, after the second ranking module re-ranks the M string sequences according to the combined probabilities of the string sequences and other ranking information that is preset to obtain the ranking result.

17. A storage medium, comprising: a computer readable non-transitory storage medium and a computer instruction, wherein the computer instruction is stored in the computer readable non-transitory storage medium; and the computer instruction is used for implementing the character correction method according to claim 1.

* * * * *